US008260646B2

(12) United States Patent
Bai et al.

(10) Patent No.: US 8,260,646 B2
(45) Date of Patent: Sep. 4, 2012

(54) METHOD AND APPARATUS FOR CUSTOMER SEGMENTATION USING ADAPTIVE SPECTRAL CLUSTERING

(75) Inventors: Xin Xin Bai, Beijing (CN); Jin Dong, Beijing (CN); Ta-Hsin Li, Yorktown Heights, NY (US); Wen Jun Yin, Beijing (CN); Bin Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 404 days.

(21) Appl. No.: 12/539,256

(22) Filed: Aug. 11, 2009

(65) Prior Publication Data

US 2011/0040601 A1     Feb. 17, 2011

(51) Int. Cl.
 *G06Q 10/00* (2012.01)
(52) U.S. Cl. ..................................................... 705/7.11
(58) Field of Classification Search ................. 705/7.11
 See application file for complete search history.

(56) References Cited

U.S. PATENT DOCUMENTS

| | | | |
|---|---|---|---|
| 5,956,693 A * | 9/1999 | Geerlings | 705/14.53 |
| 6,944,579 B2 * | 9/2005 | Shimizu | 702/196 |
| 2004/0103051 A1 * | 5/2004 | Reed et al. | 705/36 |
| 2005/0251532 A1 * | 11/2005 | Radhakrishnan et al. | 707/104.1 |
| 2007/0094067 A1 * | 4/2007 | Kumar et al. | 705/10 |
| 2008/0126264 A1 * | 5/2008 | Tellefsen et al. | 705/80 |
| 2008/0147485 A1 * | 6/2008 | Osagami et al. | 705/10 |
| 2008/0243829 A1 * | 10/2008 | Liu et al. | 707/5 |
| 2009/0132347 A1 * | 5/2009 | Anderson et al. | 705/10 |

* cited by examiner

*Primary Examiner* — Johnna Loftis
*Assistant Examiner* — Brandi P Parker
(74) *Attorney, Agent, or Firm* — Scully, Scott, Murphy & Presser, P.C.; Daniel P. Morris, Esq.

(57) ABSTRACT

A method and system for customer segmentation using adaptive spectral clustering may include determining initial segmentation labels, determining new customer behavior data, formulating a single objective minimization function that integrates the initial segmentation labels with the new customer behavior data, and determining best fit to both the initial segmentation labels and the new customer behavior data simultaneously by minimizing the single objective minimization function.

4 Claims, 1 Drawing Sheet

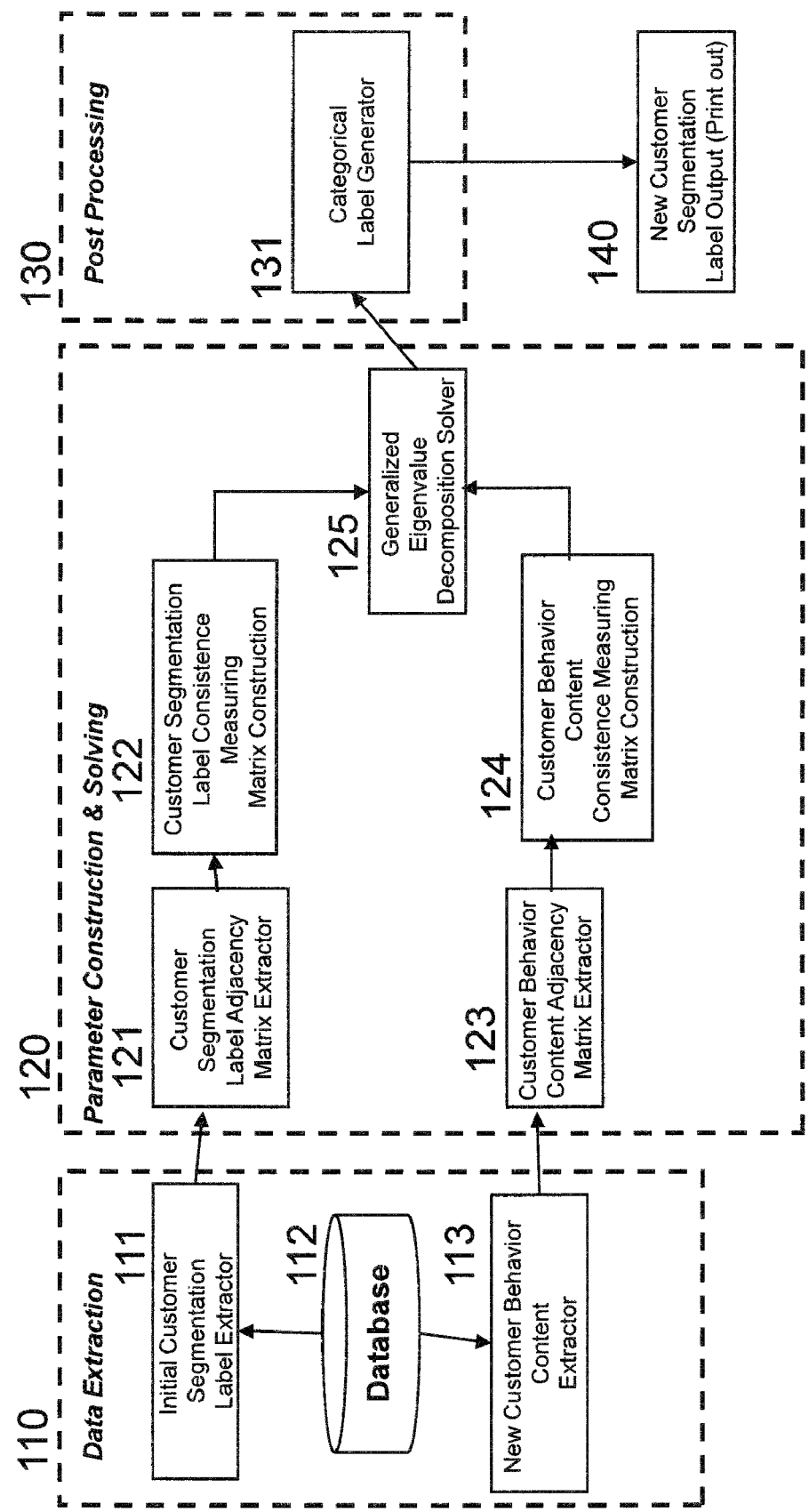

METHOD AND APPARATUS FOR CUSTOMER SEGMENTATION USING ADAPTIVE SPECTRAL CLUSTERING

FIELD OF THE INVENTION

The present disclosure relates generally to computer-implemented method and system for analyzing customer behavior and more particularly to adaptive customer segmentation.

BACKGROUND OF THE INVENTION

Customer segmentation is the basis of various customer analysis tasks. In customer analysis, one needs to understand the behavior of customer segments for marketing and management purposes. It requires that the customers in the same group have similar behavior. That is, the proper customer segmentation should fit customer behavior patterns, e.g., purchasing records, etc.

In many cases, there exists initial customer segmentation, but the initial segmentation needs to be modified because it is no longer suitable for the new customer behavior data. This requires an adaptive customer segmentation algorithm that takes both initial segmentation and new data into consideration.

BRIEF SUMMARY OF THE INVENTION

A method and system for customer segmentation using adaptive spectral clustering may be provided. The method in one aspect may comprise determining initial segmentation labels, determining new customer behavior data, and formulating a single objective minimization function that integrates the initial segmentation labels with the new customer behavior data. The single objective minimization function may include $$\frac{f^T C f}{f^T \bar{A} f},$$

where
f=vector representing values for new customer labels
C=matrix representing the similarity between new customer labels and the new behavior content;
$\bar{A}$=matrix representing the dissimilarity between new customer labels and the initial customer labels. The method may also include determining best fit to both the initial segmentation labels and the new customer behavior data simultaneously by minimizing the single objective minimization function. The determined best fit includes one or more new customer segmentation labels.

A program storage device readable by a machine, tangibly embodying a program of instructions executable by the machine to perform a method of customer segmentation using adaptive spectral clustering may be also provided. The method may comprise determining initial segmentation labels, determining new customer behavior data and formulating behavior data of a customer into a feature vector, and formulating a single objective minimization function that integrates the initial segmentation labels with the new customer behavior data. The method may also include determining customer segmentation label adjacency matrix, determining customer segmentation label consistency measuring matrix, determining customer behavior content adjacency matrix, determining customer behavior content consistence measuring matrix, and determining best fit to both the initial segmentation labels and the new customer behavior data simultaneously by minimizing the single objective minimization function. The single objective minimization function includes $$\frac{f^T C f}{f^T \bar{A} f},$$

where
f=vector representing values for new customer labels;
C=matrix representing the similarity between new customer labels and the new behavior content;
$\bar{A}$=matrix representing the dissimilarity between new customer labels and the initial customer labels. The method may also include generating categorical labels from optimal f computed in the single objective minimization function using clustering technique.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 1 shows an overview the end-to-end Bank Branch Reconfiguration System in one embodiment of the present disclosure.

DETAILED DESCRIPTION

The adaptive customer segmentation technology can be used in the following applications.

Adaptation A: Adaptation to new customer behavior features. For example, this initial customer segmentation is produced according to two customer behavior features: average purchasing price and average purchasing number. When the average purchasing frequency of each customer becomes available, the customer segmentation needs to be modified according to the new feature of average purchasing frequency.

Adaptation B: Adaptation to new customer behavior data. In Customer Relationship Management CRM systems, the customer purchasing records, e.g., weekly total purchasing numbers of product A and B, may be updated everyday. It may be necessary to update the customer segment labels of those customers according to the new purchasing numbers of A and B, for example, once a quarter.

Adaptation C: Adaptation to new customer behavior feature and data. For example, in the location A, staple food sold at a chain may be hamburger and juice, while in location B, they may be hamburger and soup. The chain has its predefined customer segmentation template in location A according to the customer behavior features related to those food products, i.e., hamburger and juice. But it may not be suitable in location B. Rather, the customer segmentation should be modified according to behavior features related to hamburger and soup. In this scenario, soup is the new feature, and hamburger is the same feature but its data is changed.

This disclosure describes a method and apparatus for adaptive customer segmentation. In one embodiment, the adaptive customer segmentation problem is formulated as a minimization problem of a single objective function that integrates initial segmentation labels with new customer behavior data to provide the best fit to both simultaneously. The minimization problem may be solved by generalized eigenvalue decomposition. The method of the present disclosure avoids mixing customer segment labels with customer behavior content in feature vectors.

In one embodiment, the system of Customer Segmentation Adapting may comprise three modules: Data Extraction (110), Parameter Construction & Solving (120) and Post Processing (130). FIG. 1 illustrates an overview of the system including the three modules.

The module of Data Extraction (110) may comprise two data extractors: Initial Customer Segmentation Label Extractor (111) and New Customer Behavior Content Extractor (113). They extract formulated input data from database (112).

Initial Customer Segmentation Label Extractor (111): This component in one embodiment extracts the initial customer segment labels of customers. The customer segment label of one customer refers to a flag or like that indicates "customer segment" to which the customer belongs. For example, in a CRM database, there are N customers: c(1), c(2), ..., C(N), and the customers are initially segmented into 5 groups: segment A, B, C, D, and E, which, for example, may be "young male", "young female", "elderly male", "elderly female", and "children". The component 111 extracts the corresponding labels: 1(1), 1(2), ..., 1(N), where 1($i$)=A, B, C, D, or E, i.e., 1($i$) may be one of 5 segments. That is, 1(3)=E means that the customer c(3) belongs to segment E. E is the customer segment label in this example. Customer segmentation divides a customer base into groups of individuals that are similar in specific ways such as age, gender, interests, spending habits, and so on, for example, for marketing purposes.

New Customer Behavior Content Extractor (113): This component in one embodiment extracts the feature content of customers, and those features which should have effects on new customer segmentation. For different applications, the customer behavior content formulations may be different. How to select the proper behavior content feature should depend on the particular application. For example, for a milk chain store retailer, the behavior content feature can be the purchasing items: number of high price milk in one week, number of middle price milk in one week, low price milk in one week. For example, a customer's (the i-th customer) behavior content can be c(i)={6, 1, 0}, which means this customer bought 6 bottles of high price milk, and 1 bottle of middle price milk in one week. Each c(i) is a vector: $c_i=\{c_{i1}, c_{i2} \ldots, c_{im}\}$, The component extracts the behavior content data c(i) for each customer i.

The module of Parameter Construction & Solving (120): This component may comprise five components: Customer Segmentation Label Adjacency Matrix Extractor (121), Customer Segmentation Label Consistence Measuring Matrix Construction (122), Customer Behavior Content Adjacency Matrix Extractor (123), Customer Behavior Content Consistence Measuring Matrix Construction (124), and Generalized Eigen-value Decomposition Solver (125). Those components compute the parameters from the input data and solve the eigen-value decomposition problem.

Customer Segmentation Label Adjacency Matrix Extractor (121): This component computes the adjacency matrix A of customer segmentation label data. The element (i, j) of the adjacency matrix A is $A_{ij}$. The value of $A_{ij}$ indicates the similarity between the customer segment label of i-th customer ($l_i$) and the customer segment label of j-th customer ($l_j$). If i-th customer has same label as j-th customer ($l_i=l_j$), then the value of $A_{ij}$ is set to 1 ($A_{ij}=1$). Otherwise, the value of $A_{ij}$ is set to 0. Suppose there are N customers, it will obtain a matrix A of N*N size.

Customer Segmentation Label Consistence Measuring Matrix Construction (122): The customer segmentation adapting task of the present disclosure in one aspect makes the new customer labels to be consistent with the initial labels. That is, the new customer segment labels should be similar to the initial labels. The method should try to make the new customer segment labels most similar to the initial labels. For example, the initial label of two customers c1 and c2 are different, and respectively in segment A "young male" and segment B "elderly male", the new labels for them are also different from A and B. If the new labels are the same, it would not be "consistent". In one embodiment, the "Consistence Measuring Matrix" constructed in this section is used to measure the "similarity" between the new labels and initial labels. This component computes the consistence measuring matrix: $\overline{A}$. First, define a N*N matrix D, where the (i,j) element is $D_{ij}$. If i=j, then, $D_{ij}=\Sigma_{k=1}^{N}A_{ik}$; otherwise: $D_{ij}$=0. That is, only the elements on the diagonal line have non-zero values. Second, define a N*N matrix $D^{-1/2}$, where the (i,j) element is $D^{-1/2}ij$. If i=j, then:

$$D_{ij}^{-1/2} = \frac{1}{\sqrt{D_{ij}}},$$

otherwise: $D^{-1/2}$if=0. Third, we can get the matrix $\overline{A}$ of size N*N by matrix product $\overline{A}=D^{-1/2}AD^{-1/2}$.

Customer Behavior Content Adjacency Matrix Extractor (123): This component computes the adjacency matrix W of customer behavior content data. The element (i, j) of the adjacency matrix W is $W_{ij}$. The value of $W_{ij}$ indicates the similarity between the customer behavior content of i-th customer ($c_i$) and the customer behavior content of j-th customer ($c_j$): $W_{ij}=k(c_i, c_j)$, where k is the similarity (or adjacency) function. It can be one of many forms. In one embodiment, k(i,j) can be the inner product value of normalized c(i) and c(j). First, c(i) should be normalized to c'(i):

$$\overline{c}_i = c_i - \frac{1}{N}\sum_{k=1}^{N} c_k,$$

and $$c'_i = \overline{c}_i / \sum_{p=1}^{M} \overline{c}_{im},$$

Second, $$k(c_i, c_j) = c'_i \cdot c'_j = \sum_{p=1}^{m} c'_{ip} * c'_{jp}.$$

Suppose there are N customers, it obtains a matrix W of N*N size.

Customer Behavior Content Consistence Measuring Matrix Construction (124): The customer segmentation adapting task attempts to make the new customer labels best fit the new behavior content. That is, the customers in one segment should have similar behaviors. For example, two customers c1 and c2 are in the same customer segment "young male", they probably have the similar behavior, for example, that of "purchasing two hamburgers and three cups of coffee in the chain store every day". This component computes the consistence measuring matrix of customer behavior content: C. First, define a N*N matrix U, where the (i,j) element is $U_{ij}$. If i=j, then, $U_{ij}=\Sigma_{k=1}^{N}W_{ik}$; otherwise: $U_{ij}=0$. That is, only the elements on the diagonal line have non-zero values. Second, define a N*N matrix $U^{-1/2}$, where the (i,j) element is $U^{-1/2}$if: If i=j, then:

$$U_{ij}^{-1/2} = \frac{1}{\sqrt{U_{ij}}},$$

otherwise: $U^{-1/2}$if=0. Third, we can get the matrix C of size N*N by matrix product: $C=I-U^{-1/2}WU^{-1/2}$, where I is a N*N matrix. If i=j, $I_{ij}=1$, otherwise, $I_{ij}=0$.

Generalized Eigen-value Decomposition Solver (125): The customer segmentation adapting in one embodiment simultaneously satisfies the both consistencies: consistence to initial label and to new customer behavior content. That is, the new labels should be similar to initial labels and best fit the behavior content as explained with reference to 122 and 124 above. Suppose $f=[f_1\ f_2\ \ldots\ f_N]$ is the value of new customer labels. To make it consistent with initial customer label, it is to maximize $f^T\overline{A}f$. To make it consistent with customer behavior content, it is to minimize $f^TCf$. By integrating both of them, that is to minimize $$\frac{f^TCf}{f^T\overline{A}f}.$$

That is: f should be the value which can produce smallest $$\frac{f^TCf}{f^T\overline{A}f}.$$

The problem can be solved by many algorithms, but one of the most efficient ways is generalized eigen-value decomposition approach. If a vector f and a value λ satisfy: $Cf=\lambda\overline{A}f$, then λ is the generalized eigen-value of matrix C and $\overline{A}$, and f is the eigen-vector. In the minimizing $$\frac{f^TCf}{f^T\overline{A}f}$$

problem, the optimal f is the eigen-vector whose corresponding eigen-value is the smallest eigen-value of matrix C and $\overline{A}$. So we can use generalized eigen-value decomposition approach to compute the smallest λ and the right f.

The f has a series of continuous values from 0 to 1, which is referred to herein as "soft label". They are not the categorical labels. The next module is to generate the category label based on the continuous f. Categorical label provide definite labels of segments, for example, "young male", "old male", etc, which can be represented by discrete numbers, for example, 1, 2, etc., while soft label is represented by continuous number. For example, a customer in categorical labels of 1 or 2, provide information that, respectively the customer is in segment 1 or 2. Since soft labels, for example, of values 0.80, 0.81, do not directly tell the segment, those values are converted into categorical labels.

The module of Post Processing (130): The post processing module includes Categorical Label Generator (131) component.

Categorical Label Generator (131): The component is to generate the categorical label from the "soft label". For example, if the soft label f has {0.1, 0.2, 0.4, 0.5, 0.8, 0.9}, and we want to generate three customer segments, then the f should be categorized as {1, 1, 2, 2, 3, 3}, which includes categorical values. Each value indicates a customer segment label. The problem of clustering one dimension data into several clusters may be used to categorize the soft labels. Many clustering technologies can be used to perform this task. The mostly used method is k-means clustering. Categorical labels are generated from soft label using clustering technologies. If two soft labels are more similar, they should more likely be converted into same categorical label. In the above example, the two soft label 0.1 and 0.2, they are the most close, so they can be categorized into 1, while 0.4 and 0.5 are converted into 2.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A computer-implemented method for customer segmentation using adaptive spectral clustering, comprising:
    determining initial segmentation labels;
    determining new customer behavior data;
    formulating a single objective minimization function that integrates the initial segmentation labels with the new customer behavior data, the single objective minimization function including $$\frac{f^T C f}{f^T \overline{A} f},$$

wherein
    f=vector representing values for new customer labels;
    C=matrix representing the similarity between new customer labels and the new behavior content;
    $\overline{A}$=matrix representing the dissimilarity between new customer labels and the initial customer labels;
    determining, by a processor, best fit to both the initial segmentation labels and the new customer behavior data simultaneously by minimizing the single objective minimization function, wherein the determined best fit includes one or more new customer segmentation labels,
    wherein the step of determining new customer behavior data includes formulating behavior data of a customer into a feature vector,
    wherein the single objective minimization function is minimized using eigen-value decomposition,
    the method further including:
    determining customer segmentation label adjacency matrix;
    determining customer segmentation label consistency measuring matrix;
    determining customer behavior content adjacency matrix;
    determining customer behavior content consistence measuring matrix,
    wherein the single objective minimization function uses the customer segmentation label adjacency matrix, the customer segmentation label consistency measuring matrix, the customer behavior content adjacency matrix, and the customer behavior content consistence measuring matrix.

2. The method of claim 1, wherein the step of determining best fit to both the initial segmentation labels and the new customer behavior data simultaneously includes determining f that produces smallest $$\frac{f^T C f}{f^T \overline{A} f}.$$

3. The method of claim 2, further including:
    generating categorical labels from f, wherein f includes a series of continuous numbers, using a clustering technique.

4. A program storage device readable by a machine, tangibly embodying a program of instructions executable by the machine to perform a method of customer segmentation using adaptive spectral clustering, comprising:
    determining initial segmentation labels;
    determining new customer behavior data and formulating behavior data of a customer into a feature vector;
    formulating a single objective minimization function that integrates the initial segmentation labels with the new customer behavior data;
    determining customer segmentation label adjacency matrix;
    determining customer segmentation label consistency measuring matrix;
    determining customer behavior content adjacency matrix;
    determining customer behavior content consistence measuring matrix; and
    determining best fit to both the initial segmentation labels and the new customer behavior data simultaneously by minimizing the single objective minimization function, wherein the single objective minimization function includes $$\frac{f^T C f}{f^T \overline{A} f},$$

wherein
    f=vector representing values for new customer labels;
    C=matrix representing the similarity between new customer labels and the new behavior content;
    $\overline{A}$=matrix representing the dissimilarity between new customer labels and the initial customer labels; and
    generating categorical labels from optimal f computed in the single objective minimization function using a clustering technique.

* * * * *